(12) United States Patent
Kulidjian et al.

(10) Patent No.: US 7,809,992 B2
(45) Date of Patent: Oct. 5, 2010

(54) DEVICE AND METHOD FOR MALFUNCTION MONITORING AND CONTROL

(75) Inventors: Ara Kulidjian, Toronto (CA); Valeri L. Kirischian, Toronto (CA); Thomas D. Perry, North York (CA)

(73) Assignee: ATI Technologies ULC, Markham, Ontario (CA)

( * ) Notice: Subject to any disclaimer, the term of this patent is extended or adjusted under 35 U.S.C. 154(b) by 615 days.

(21) Appl. No.: 11/161,229

(22) Filed: Jul. 27, 2005

(65) Prior Publication Data

US 2007/0028148 A1 Feb. 1, 2007

(51) Int. Cl.
G06F 11/00 (2006.01)
(52) U.S. Cl. ............................. 714/47; 714/22; 713/340
(58) Field of Classification Search .................... 714/47, 714/22; 713/340
See application file for complete search history.

(56) References Cited

U.S. PATENT DOCUMENTS

| | | | |
|---|---|---|---|
| 7,051,233 B2 * | 5/2006 | Fukumori et al. | 714/14 |
| 7,051,236 B2 * | 5/2006 | Sanu | 714/22 |
| 2003/0028827 A1 * | 2/2003 | Gray | 714/46 |

OTHER PUBLICATIONS

Berkshire Products, Inc.; Welcome to the home of the Award Winning PC Watchdog; from www.pcwatchdog.com; 2006; pp. 1-3.
Berkshire Products, Inc.; PCI PC Watchdog; from www.berkprod.com; 2006; pp. 1-3.
Berkshire Products, Inc.; ATX Reset Adapter; from www.berkprod.com; 2006; pp. 1-3.
Berkshire Products, Inc.; Low Profile PCI PC Watchdog; from www.berkprod.com; 2006; pp. 1-4.
Berkshire Products, Inc.; USB PC Watchdog; from www.berkprod.com; 2006; pp. 1-3.
Berkshire Products, Inc.; ISA PC Watchdog; from www.berkprod.com; 2006; pp. 1-2.

* cited by examiner

*Primary Examiner*—Yolanda L Wilson
(74) *Attorney, Agent, or Firm*—Vedder Price P.C.

(57) ABSTRACT

A monitoring device and method are provided to monitor a separate device for malfunctions and to control and restore the malfunctioning monitored device to a normal functioning state. A malfunction state includes the monitored device being powered off or in a standby power state. The monitoring device includes control logic operative to determine a malfunction state of the monitored device and to control a reapplication of power to the monitored device to reboot the monitored device based on the determined malfunction state of the monitored device. The method for monitoring and controlling the monitored device comprises the steps of: determining a malfunction state of the monitored device; and controlling a reapplication of power to the monitored device to reboot the monitored device based on the determined malfunction state of the monitored device.

21 Claims, 8 Drawing Sheets

DEVICE AND METHOD FOR MALFUNCTION MONITORING AND CONTROL

FIELD OF THE INVENTION

The present invention relates generally to recovery of devices to a normal operating mode and more particularly, to the recovery of devices, such as a desktop computer or other device, to a normal operating mode by a separate monitoring device in response to a detected malfunction.

BACKGROUND OF THE INVENTION

Personal computers (PCs), embedded computers, and other devices have evolved over the previous decades to meet the needs of a variety of applications. A wide variety of applications exist in which devices, for example digital circuits and processors, are relied upon to be available almost continuously. For example, telecommunication networks rely upon the almost continuous availability, also known as reliability, of computers and network equipment to provide phone service whenever needed. The packet switching network of the Internet provides another example. Internet service providers (ISPs) strive to provide reliable nodes within the networks of the Internet to provide on-demand Internet availability. Numerous industrial and commercial applications exist wherein the availability of devices or computers is critical. For example, most supermarkets and retail businesses have automated purchasing systems to allow consumers to purchase products. Brokerage systems are used in purchasing and selling stocks and bonds, and require almost continuous availability. As a consequence of the need for reliability and availability, a device may require automatic rebooting or reinitialization to restore the device from a malfunction state to a proper functioning state.

In response to a long felt need to provide reliability and availability, progress has been made in providing reliable circuits and devices. A more expensive approach uses redundant hardware and software, and may use self-monitoring or auditing software, to provide system hardware and software that is rarely nonfunctional. A less expensive approach detects and corrects a malfunction in a monitored device through use of a monitoring device, such as a card inserted into an expansion slot, such as a peripheral component interface (PCI) slot, of a computer or other monitored device. At least some monitoring devices, for example the PC Watchdog card from Berkshire Products, Inc., appear to apply a reset approach that reinitializes software. Reinitializing software is known in the art as a warm/soft reboot. The PC Watchdog product upon detecting a malfunction in the monitored device, sends a reset signal to the device to cause a reset, i.e. causes a warm/soft reboot of the device. However, warm reboots may not always return the monitored device to a functioning state.

A malfunction may also result in electronic circuitry becoming locked in an abnormal state, a state which may not be corrected without removing and restoring power (e.g. by performing a power reinitialization). At least in some malfunctions, a power reinitialization may be required to return the monitored device to a normal functioning state. Returning power or reapplying power is known in the art as performing a cold/hard reboot and is normally performed manually by a person pressing an on/off power button on the device. Among other drawbacks, a person must be present when a malfunction occurs to manually reinitialize the device. Therefore, the malfunction may prevent use of the device for long periods of time (e.g. until a person reboots the device).

In view of the above, and as a consequence of the long felt need for improvement in reliability and availability of devices and systems, further improvement is desired. An improvement in monitoring devices is needed to detect malfunctions in a monitored device and automatically control and return the malfunctioning device to a normal functioning state.

BRIEF DESCRIPTION OF THE DRAWINGS

The invention will be more readily understood in view of the following description when accompanied by the below figures and wherein like reference numerals represent like elements.

DETAILED DESCRIPTION OF THE INVENTION

Figure 1:
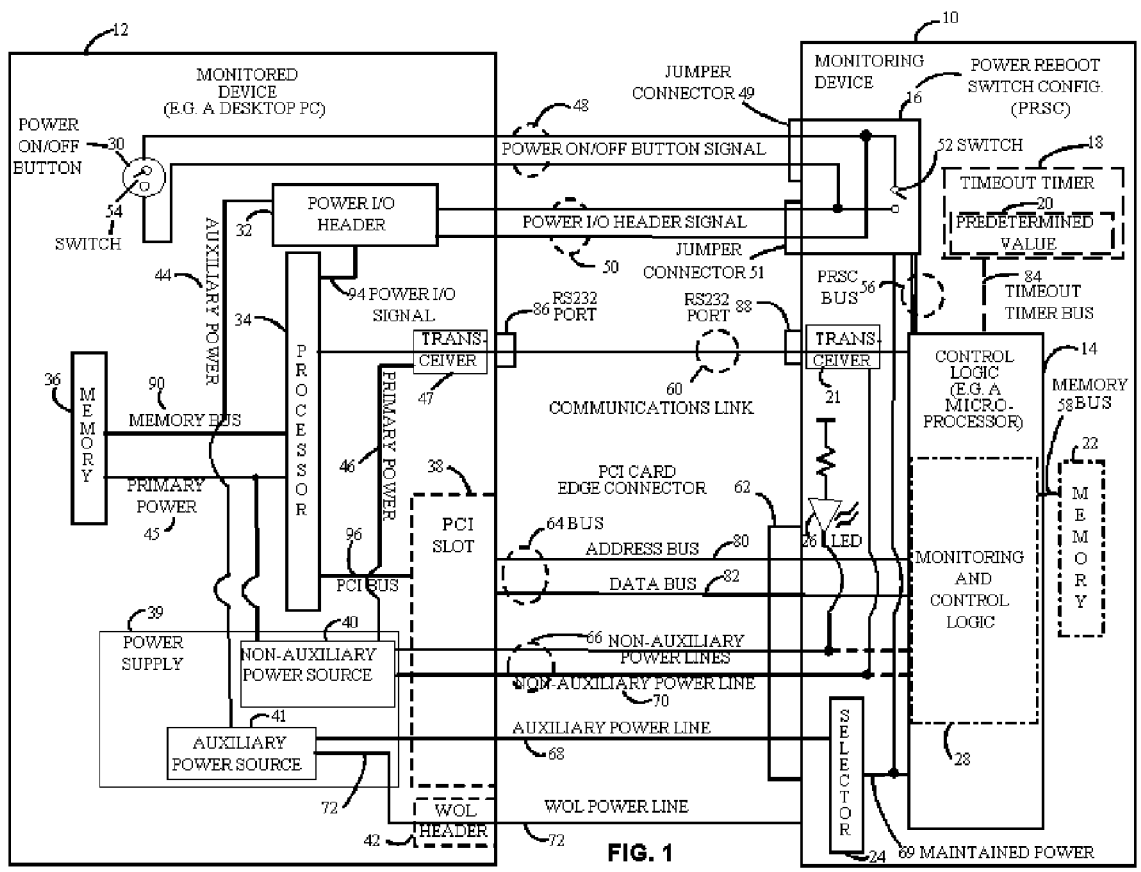
FIG. 1 illustrates a schematic block diagram of an example of a monitoring device configured to be coupled to a monitored device according to an embodiment of the invention.

A monitoring device and method are provided to monitor a separate device for malfunctions and to control and restore the malfunctioning monitored device to a normal functioning state. The monitoring device has control logic operative to determine a malfunction state of the monitored device, e.g. may monitor and detect a lack of power for the monitored device or other conditions. The monitoring device may then cause power to be reapplied to the monitored device to cold reboot the monitored device. For example, reapplying power may include powering up a device that is powered off, or powering down and then powering up a device that has power (e.g. the device may be in a standby power state as well as fully powered). A method for monitoring and controlling the monitored device includes: determining a malfunction state of the monitored device; and controlling a reapplication of power to the monitored device to reboot the monitored device based on the determined malfunction state.

In determining a malfunction state of the monitored device, the monitored device may malfunction in various ways. For example, faulty code within the operating system or application programs, also known in the art as "bugs", may result in the monitored device becoming inoperable. As another example, automated test programs within the monitored device may be executed to exercise and validate various features of the software, firmware or hardware of the monitored device. However, such automated tests may when validating the hardware and software cause the software to crash or hang, or cause the hardware to latch improperly and become inoperable. Such automated tests may also cause the monitored device to become powered off or in a standby power state. Malfunction states for devices and systems required to be almost continuously available, for example a 9-1-1 emergency service or an air traffic control system, may include a powered off or standby power state of the monitored device.

To determine a malfunction state of the monitored device, the monitoring device may monitor the power state of the monitored device and determine a malfunction when the monitored device is not in a full power mode, e.g. is powered off or in a standby power state. The monitoring device may then signal the monitored device to reapply power (e.g. perform a cold reboot). In the situation wherein the monitoring device obtains power from the monitored device, the monitoring device needs sufficient power to maintain suitable operation to signal the monitored device when the monitored device is powered off. The monitoring device may be configured to receive power from a maintained power source of the monitored device, e.g. an auxiliary power source. The auxiliary power source provides sufficient power to the monitoring device when the monitored device is powered off for the monitoring device to signal the monitored device to perform a cold reboot. Maintained power may also be provided from a wake-on-LAN (WOL) header of the monitored device when an auxiliary power source is not provided by the monitored device.

The determined malfunction state of the monitored device may be based on at least one of: a monitored power status, a monitored bus activity, and a detection of whether an expected message was received over a communications link. For example, if the monitored device is powered off, the malfunction state may be determined to be powered-off. If the monitored device has power, but bus activity is not present for a monitored bus of the monitored device, the malfunction state may be determined to be standby-power. In the situation wherein the monitored device has power and bus activity is present, but an expected message is not received from the monitored device over the communications link, the malfunction state may be determined to be powered-and-malfunctioning.

One of the many advantages provided by the monitoring device as embodied herein is the ability to detect at the monitored device a low power state, e.g. a standby power state or a powered off power state, and, in response, signal the monitored device to reapply power (e.g. perform a cold reboot). Additionally, if desired, the monitoring device may communicate with the monitored device via a communications link. The monitoring device may expect a message from the monitored device periodically, and when not receiving the expected periodic message within the predetermined period, may determine a malfunction and signal the monitored device to reapply power.

Alternatively, the expected message may not be a periodic message but rather in response to a test message sent from the monitoring device. For example, the monitoring device may simulate a keyboard device to test the monitored device. The monitoring device sends a test key press message to the monitored device over the communications link, e.g. a make-and-break key code message of NUM LOCK, SCROLL LOCK, or CAPS LOCK. In return, the monitoring device expects a set-LED response message from the monitored device indicating that an LED corresponding to the key press be appropriately set. When not receiving the response message, the monitoring device may assume the monitored device to be malfunctioning, and may signal the monitored device to reapply power.

FIG. 1 illustrates a schematic block diagram of one example of a monitoring device 10 that is configured to monitor and control a monitored device 12 according to an embodiment herein described. The monitoring device 10 of FIG. 1 has a control logic 14 coupled to a power reboot switch configuration 16, a timeout timer 18 with a predetermined value 20, a transceiver 21, a memory 22, a selector 24, and a light emitting diode (LED) 26. The control logic 14 may be implemented as hardware, processor executing firmware, processor executing software, or as any suitable combination thereof. The embodiment of FIG. 1 shows the control logic 14 as having monitoring and control logic 28, which, for example, may be instructions retrieved from the memory 22 and executed by the control logic 14.

The monitoring device 10 has the power reboot switch configuration 16 coupled to a power on/off button 30 and to a power input/output (I/O) header 32 of the monitored device 12. The monitored device 12 of FIG. 1 has a processor 34 coupled to the power I/O header 32, a memory 36, a peripheral component interface (PCI) slot 38, a power supply 39 which includes a non-auxiliary power source 40 and an auxiliary power source 41, and a wake-on-LAN (WOL) header 42. The auxiliary power source 41 provides auxiliary power 44 to the power I/O header 32. The non-auxiliary power source 40 provides primary power 45 to power the memory 36 and the processor 34, and primary power 46 to power a transceiver 47.

The power on/off button 30 of the monitored device 12 is connected to the power I/O header 32 through the power reboot switch configuration 16 via a power on/off button signal 48 and a power I/O header signal 50. The power on/off button signal 48 is connected via a jumper connector 49, and the power I/O header signal 50 via a jumper connector 51, to the power reboot switch configuration 16. The connection of the power on/off button 30 through the power reboot switch configuration 16 is a parallel connection with a switch 52 of the power reboot switch configuration 16 such that the power I/O header 32 may be signaled from the operation of the power on/off button 30 or the operation of the switch 52 of the power reboot switch configuration 16. For example, the power on/off button 30 may be depressed causing closure of a switch 54 and thus providing a current to be sensed by the monitored device 12 at the power I/O header 32. In this case, the signal or current merely passes through the power reboot switch configuration 16 from the power on/off button 30 to the power I/O header 32. Alternatively, instead of depressing and operating the power on/off button 30, the switch 52 may be closed by the power reboot switch configuration 16 under control of the control logic 14 to signal the power I/O header 32 over the power I/O header signal 50. In this way, closure of the switch 52 at the monitoring device 10 may simulate depressing the power on/off button 30 at the monitored device 12, and opening of the switch 52 may simulate release of the power on/off button 30.

As an example of use of the power on/off button 30, when the power on/off button 30 is depressed for at least one second, but not more than five seconds, a signal is generated at the power I/O header 32 indicating a request to power up the monitored device 12. When the power on/off button 30 is depressed for at least five seconds, a signal is generated at the power I/O header 32 indicating a request to the monitored device 12 to power down. Likewise, such signaling at the power I/O header 32 by the power on/off button 30 may be simulated merely by causing closure of the switch 52 of the power reboot switch configuration 16. The power reboot switch configuration 16 is operationally coupled to the control logic 14 via a power reboot switch configuration (PRSC) bus 56. The control logic 14 controls the operation of the switch 52 and may sense the operation of the power on/off button 30 via the PRSC bus 56. The control logic 14 may be implemented, for example, as a microcontroller, a microprocessor, or other similar device. In one embodiment, the control logic 14 may be implemented using a microcontroller PIC16LF877 made by Microchip Technology, Inc., Chandler, Ariz. However, any suitable structure may be used.

Although the above describes a signal as being generated by the closure of the switch 54 of the power on/off button 30 or the switch 52 of the power reboot switch configuration 16, in alternative embodiments the signal may be generated by opening of the switch 54 or opening of the switch 52. The sensing of a signal at the power I/O header 32 may be the sensing of a current or voltage, or the sensing of a lack of current or voltage. It will be recognized that any suitable signaling mechanism may be used within the monitored device 12 and the monitoring device 10.

As described in this example, the control logic 14 is coupled to the memory 22 via a memory bus 58. The control logic 14 is configured to obtain and execute instructions to serve as the monitoring and control logic 28 stored within the memory 22 to perform the operations of the monitoring device 10 as described herein. In an alternative embodiment, the control logic 14 may be hardware, already configured to perform the operations of the monitoring and control logic 28, or any suitable configuration of hardware, software, or firmware. In yet another embodiment, the control logic 14 may include the memory 22. The memory 22 may include RAM memory, EEPROM memory, FLASH memory, and any other type of memory suitable for storing instructions. The instructions may be stored in the memory 22 at the time when the memory 22 is provided for the monitoring device 10. For example, the instructions may be provided when the memory 22 is produced at a factory, or the instructions may be stored into the memory 22 by use of an EEPROM-burning device prior to installation of the memory 22 in the monitoring device 10. In an alternative embodiment, the monitored device 12 may provide the instructions to the monitoring device 10 over a communications link 60, the instructions are stored into the memory 22 by the control logic 14, or directly to the memory 22 as received from the monitored device 12.

The control logic 14 may operate in different modes, for example, the control logic 14 may be in a programming mode when receiving the instructions from the monitored device 12, or may be in a normal operating mode when monitoring the operation of the monitored device 12. It will be recognized that the control logic 14 may be any suitable circuitry, processor, or processors that perform the operations described herein.

In the example of FIG. 1, the monitoring device 10 uses a bus interface slot, such as a peripheral component interface (PCI) slot 38, of the monitored device 12 to obtain power, and to monitor power and bus activity of the monitored device 12. The control logic 14 connects to the PCI slot 38 via a PCI card edge connector 62. The control logic 14 has access to a bus 64, non-auxiliary power lines 66, and an auxiliary power line 68 via the PCI slot 38. The control logic 14 and the power reboot switch configuration 16 obtain maintained power 69 from the monitored device 12 via an auxiliary power line 68 of the auxiliary power source 41. If the auxiliary power line 68 is not provided via the PCI slot 38, maintained power 69 may be selected via the selector 24 from a WOL power line 72 that is connected to the WOL header 42. When the monitored device 12 is powered off, the maintained power 69 provides sufficient power from the monitored device 12 to maintain operation of the control logic 14 and the power reboot switch configuration 16. However, the maintained power 69 is typically insufficient to light the LED 26 and operate the transceiver 21. In order to operate the transceiver 21 and light LEDs, e.g. LED 26, power is obtained from the non-auxiliary power source 40 via the non-auxiliary power lines 66, e.g. non-auxiliary power line 70. The non-auxiliary power lines 66 are shown extended as dashed lines to the control logic 14 in FIG. 1 to illustrate that the monitoring device 10 monitors the power state of the monitored device 12 by monitoring power on the non-auxiliary power lines 66 as well as obtaining power for the transceiver 21 and the LED 26. The LED 26 when lit may indicate that the monitored device 12 is operating normally, or may indicate that the monitoring device 10 is operating normally. Typically, the non-auxiliary power source 40 and the auxiliary power source 41 are correspondingly internal power rails of the monitored device 12.

Besides the ways illustrated in FIG. 1 for the monitoring device 10 to obtain power from the monitored device 12, other suitable ways may be implemented for the monitoring device 10 to obtain power. For example, the monitoring device 10 may be supplied power from an AC wall outlet via a power cord (not shown in FIG. 1), from a battery (not shown in FIG. 1), or from some other port or slot of the monitored device 12.

The bus 64 and the non-auxiliary power lines 66 merely pass through the PCI card edge connector 62 to the control logic 14. The auxiliary power line 68 passes through the PCI card edge connector 62 to the selector 24. The selector 24 is positioned to select maintained power 69 either from the PCI slot 38 or the WOL header 42, the power merely passing through the selector 24.

In the example of FIG. 1, the control logic 14 determines the power state of the monitored device 12 by monitoring the non-auxiliary power lines 66 and the bus 64. For example, the power state of the monitored device 12 may be determined to be powered-off when at least one of the non-auxiliary power lines 66, e.g. the non-auxiliary power line 70, has a voltage level of basically zero volts. When all of the non-auxiliary power lines 66 have voltage levels other than basically zero volts, the control logic 14 may determine the power state of the monitored device 12 to be either in a powered-on state or a standby-power state. At least some monitored devices 12 may power down to a standby-power state wherein not all of the circuitry of the monitored device 12 is using power, even though power is available. Bus activity on the bus 64 may be monitored by the control logic 14 to determine whether the monitored device 12 is in the standby-power state.

Logic levels of address bus 80 and data bus 82 which are included in the bus 64 may be monitored by the control logic 14. When the control logic 14 senses changes in the logic levels of the address bus 80 and/or the data bus 82, the control logic 14 may determine bus activity to be present on the bus 64. In this case, and when power is present on the non-auxiliary power lines 66, the control logic 14 may determine the monitored device 12 to be in the powered-on state. However, if the control logic 14 senses power on the non-auxiliary power lines 66 and does not sense bus activity on the bus 64, the control logic 14 may determine the power state to be standby-power.

Besides the monitoring of the power state of the monitored device 12, the state of software within the monitored device 12 may also be monitored. At least in some monitored devices 12, software may be present that is not operating normally and may be referred to as "crashed". As known in the art, operating systems and/or other software may not be operating, and thus is termed as "crashed", although the monitored device 12 has power and hardware circuitry that is performing normally. At least some monitored devices 12 have a reset button that when depressed, causes a warm/soft reboot or reinitialization of software. However, the hardware circuitry of the monitored device 12 may also become latched and locked in an abnormal state such as to be non-functional. In this case, a reset (i.e. a warm/soft reboot) typically does not restore the hardware circuitry of the monitored device 12 to an operational state. Thus, a power button or power switch, e.g. the power on/off button 30, may be operated to cause a cold/hard reboot or reinitialization of hardware circuitry as well as software. The embodiment of FIG. 1 shows a configuration wherein the power reboot switch configuration 16 may be operated by the control logic 14 via the PRSC bus 56 to simulate operation of the power on/off button 30.

The communications link 60 provides a mechanism for determining crashed software within the monitored device 12. The communications link 60 may be used in multiple ways by the control logic 14 to determine malfunctioning software for a fully powered monitored device 12. One mechanism may be provided in the form of the timeout timer 18. Although shown in FIG. 1 as separate from the control logic 14, the timeout timer 18 may be implemented as hardware or software with the control logic 14. The timeout timer 18 may be controlled via a timeout timer bus 84 from the control logic 14. The control logic 14 sets or resets the predetermined value 20 for the timeout timer 18. The resetting of the timeout timer 18 to the predetermined value 20 is performed by the control logic 14 when the control logic 14 receives an I-AM-ALIVE message over the communications link 60 from the monitored device 12. The timeout timer 18 counts down to zero from the predetermined value 20 and when reaching zero, performs an interrupt to inform the control logic 14 of the timeout. Alternatively, the predetermined value 20 may be a negative value, and the timeout timer 18 may count up and timeout when reaching zero. The use of a timeout timer is well known in the art. The control logic 14 expects to receive the I-AM-ALIVE message periodically. If not receiving the I-AM-ALIVE message within the predetermined period of time, signaled by the timeout timer 18 timing out, the control logic 14 may determine the software state of the monitored device 12 to be malfunctioning. When software within the monitored device 12, e.g. operating system software, ceases to function properly, a low priority message handler process of the monitored device 12 may cease to be executed and thus cease communicating over the communications link 60. In this situation, the control logic 14 ceases to receive I-AM-ALIVE messages and the timeout timer 18 will time out.

In an alternative example of use of the communications link 60, a reboot message may be sent to the control logic 14 by self auditing and monitoring software of the monitored device 12 upon detecting problems in software of the monitored device 12. Upon receiving the reboot message, the control logic 14 determines the software state of the monitored device 12 to be malfunctioning. In yet another example of use of the communications link 60, the executing monitoring and control logic 28 within the control logic 14 may simulate a keyboard device to the monitored device 12.

For example, the communications link 60 may be implemented as an RS232 interface at the RS232 ports 86 and 88. Other alternative interfaces may be used as well, e.g. USB, RS422, etc. The RS232 transceivers 47 and 21 may be respectively integrated into the processor 34 and the control logic 14, or may be independently provided as shown in FIG. 1. Software within the monitored device 12, e.g. a communications driver and message handler, may view the communications link 60 as an RS232 connection to a keyboard device. The monitoring and control logic 28 may simulate such a keyboard device to the monitored device 12. In this embodiment, the simulated keyboard device may send a key press type message to the monitored device 12 over the communications link 60 and expect within a predetermined amount of time to receive the response message. For example, the monitoring and control logic 28 may send a make-and-break key code message simulating a key press of NUM LOCK, SCROLL LOCK, or CAPS LOCK to the monitored device 12. In response, the monitoring and control logic 28 expects to receive the response message, e.g. a set-LED message, from the monitored device 12 requesting an LED, e.g. the LED 26, corresponding to the key press be appropriately set. If software within the monitored device 12 is malfunctioning, the response message typically will not be received by the monitoring and control logic 28, and the monitoring and control logic 28 determines the software state of the monitored device 12 to be malfunctioning.

The control logic 14 may be implemented with any suitable control logic or processors, e.g. application-specific integrated circuits (ASICs), microprocessors, and the like. Although the PCI slot 38 of the monitored device 12 is the embodiment described in FIG. 1, other suitable expansion slots of the monitored device 12, and/or connections from the monitored device 12 to the monitoring device 10, may be used that allow monitoring and control of the monitored device 12 as described herein. For example, the monitoring device 10 may be implemented as a printed circuit board (PCB) or a card with an edge connector configured to connect to the monitored device 12.

In concluding the example of FIG. 1, the monitored device 12 may have the processor 34 connected to the memory 36 via a memory bus 90. Instructions within the memory 36 when retrieved and executed by the processor 34 provide the functions of the monitored device 12. Depending upon the mother board configuration, the monitoring device 10 may receive maintained power 69 from either auxiliary power line 68 or WOL power line 72 via a jumper or switch (not shown). A PCI bus 96 allows the processor 34 access to the PCI slot 38. Although FIG. 1 shows the monitored device 12 to have the processor 34 with the memory 36, the monitored device 12 may be any device that allows for monitoring and control of its power as claimed herein.

Figure 2:
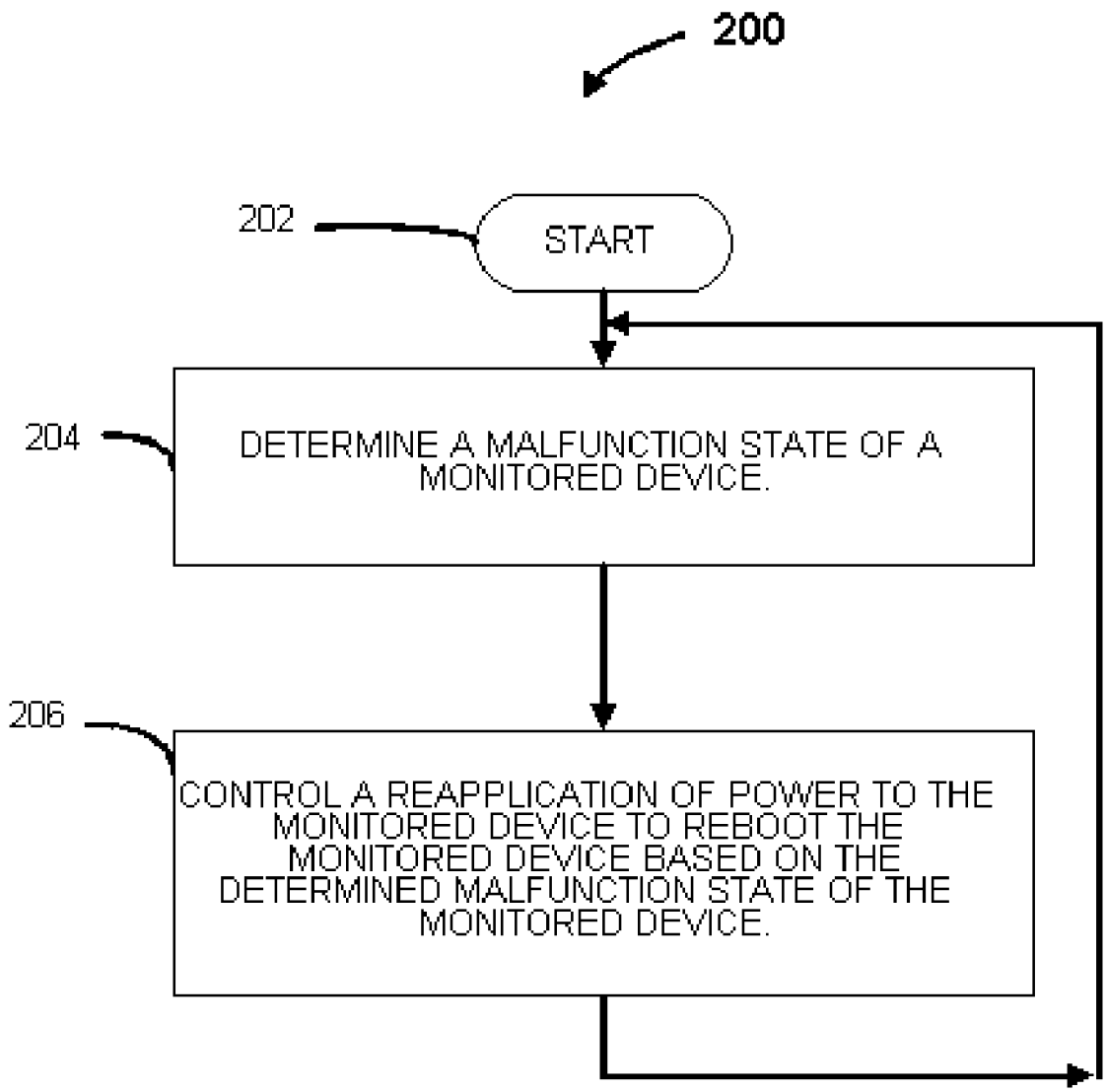
FIG. 2 shows a flowchart describing one example of a method for monitoring and controlling a monitored device in accordance with an embodiment of the invention.

FIG. 2 shows a flow chart describing one example of a method 200 for monitoring and controlling a monitored device 12 (FIG. 1) according to an embodiment herein described. The method 200 begins at the start block 202 with the powering up and booting of the monitoring device 10 to a normal operational state. The method 200 is comprised of two blocks 204 and 206 iteratively executed while the monitoring device 10 is in operation. The block 204 includes determining a malfunction state of the monitored device 12. Such a determination may be made, for example, by monitoring the non-auxiliary power lines 66 of the monitored device 12, the bus activity of the bus 64 of the monitored device 12, and the messages expected from the monitored device 12 over the communications link 60. Further details will be given in subsequent discussion of FIG. 7. Block 206 includes controlling a reapplication of power to the monitored device 12 to reboot the monitored device 12 based on the determined malfunctioned state of the monitored device 12. For example, if the monitored device 12 is already powered off and thus a powered-off malfunction state has been determined, the reapplication of power may be nothing more than applying power to the monitored device 12. For example, the monitoring device 10 signals the monitored device 12 to power up. If the malfunction state indicates power being present without bus activity, such as the monitored device 12 is in a standby-power state, the reapplication of power may include first signaling, for example, to cause powering down of the monitored device 12 followed by a signaling to cause powering up of the monitored device 12. Controlling a reapplication of power may include signaling the monitored device 12 from the monitoring device 10 by use of the switch 52 as described in FIG. 1. However, any suitable structure or method may be used.

Figure 3:
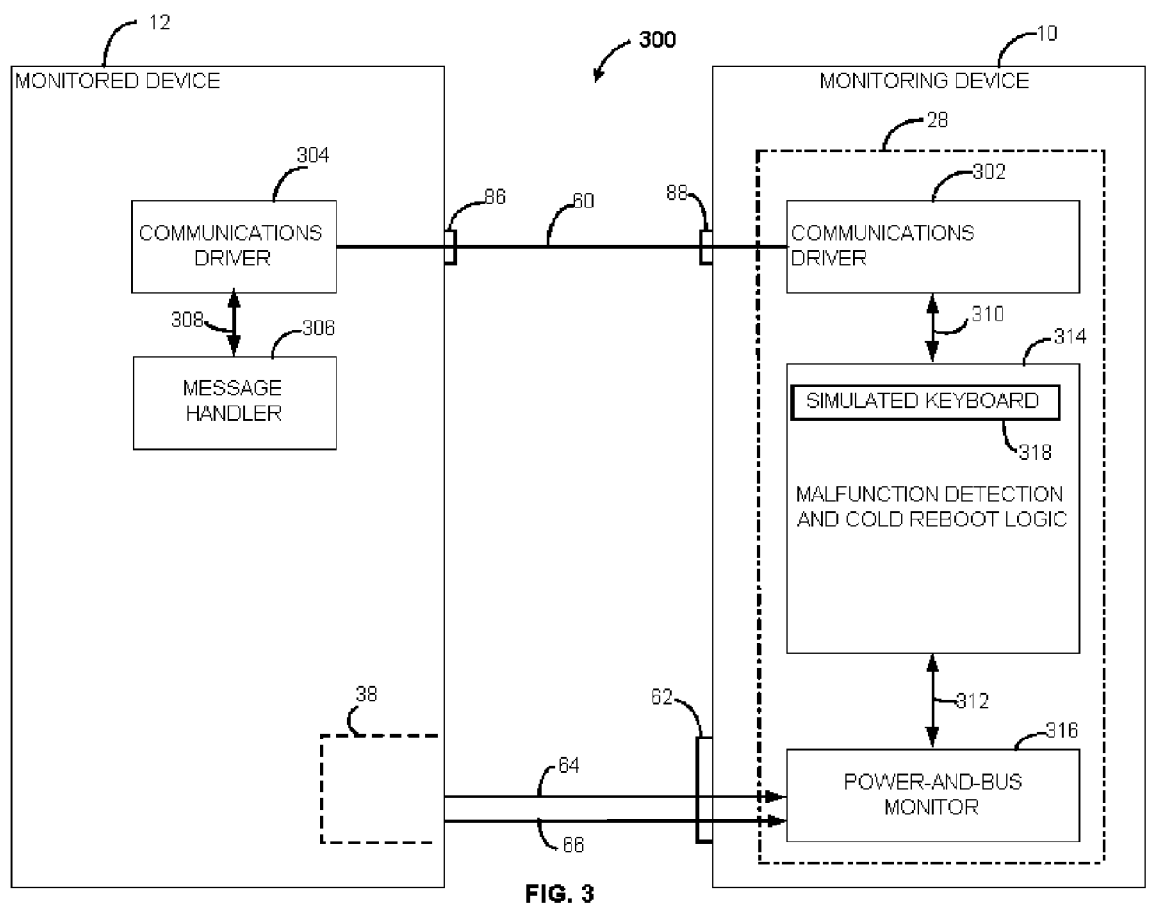
FIG. 3 illustrates a schematic block diagram of one example of software modules formed in accordance with the embodiment of FIG. 1.

FIG. 3 illustrates a schematic block diagram of one example of software modules 300 formed in accordance with the embodiment of FIG. 1. In this example, the software modules of the monitoring and control logic 28 (FIG. 1) include a communications driver 302, a malfunction detection and cold reboot logic 314, and a power-and-bus monitor 316. The communications driver 302 communicates over the communications link 60 with a communications driver 304 of the monitored device 12. A message handler 306 interacts with the communications driver 304 through the mechanism of function calls 308 as is known in the art of software. The communications driver 304 and the message handler 306 operate to send the expected messages to the monitoring device 10. Typically, when software of the monitored device 12 is "crashed", the message handler 306 and the communications driver 304 will not communicate the expected messages to the monitoring device 10. In this manner, the monitoring device 10 may detect malfunctioning software within the monitored device 12.

The malfunction detection and cold reboot logic 314 operates with the communications driver 302 and the power-and-bus monitor 316 to perform the essential operations of the monitoring device 10. The malfunction detection and cold reboot logic 314 may operate with the communications driver 302 and the power-and-bus monitor 316 via corresponding function calls 310 and 312 as is known in the art of software. The malfunction detection and cold reboot logic 314 receives from the communications driver 302 the expected messages over the communications link 60 from the communications driver 304. The power-and-bus monitor 316 monitors the power state of the monitored device 12 via the non-auxiliary power lines 66 and the bus activity of the bus 64 as shown and described in FIG. 1. When detecting basically zero volts for at least one of the non-auxiliary power lines 66, the malfunction detection and cold reboot logic 314 determines the power state of the monitored device 12 to be powered-off. When detecting power at all of the non-auxiliary power lines 66, but not detecting bus activity on the bus 64, the malfunction detection and cold reboot logic 314 determines the power state of the monitored device 12 to be standby-power. The malfunction detection and cold reboot logic 314 may include a simulated keyboard 318. The simulated keyboard 318 simulates a keyboard device to the message handler 306. As previously discussed for FIG. 1, the simulated keyboard 318, for example, may send a make-and-break key code message of CAPS LOCK to the message handler 306 and expect a set-LED response message. If not receiving the expected response message, the malfunction detection and cold reboot logic 314 may determine a software malfunction. With power and bus activity present, the malfunction detection and cold reboot logic 314 determines the malfunction state to be powered-and-malfunctioning. Please note that the terms "software" and "software module" as used herein may also refer to firmware and any suitable combination of software and firmware. The software modules 300 of FIG. 3 provide one example of a decomposition of software, e.g. a software modularity, for the implementation of software for FIG. 1. Other suitable decompositions of software may be found to provide for the operations described herein.

Figure 4:
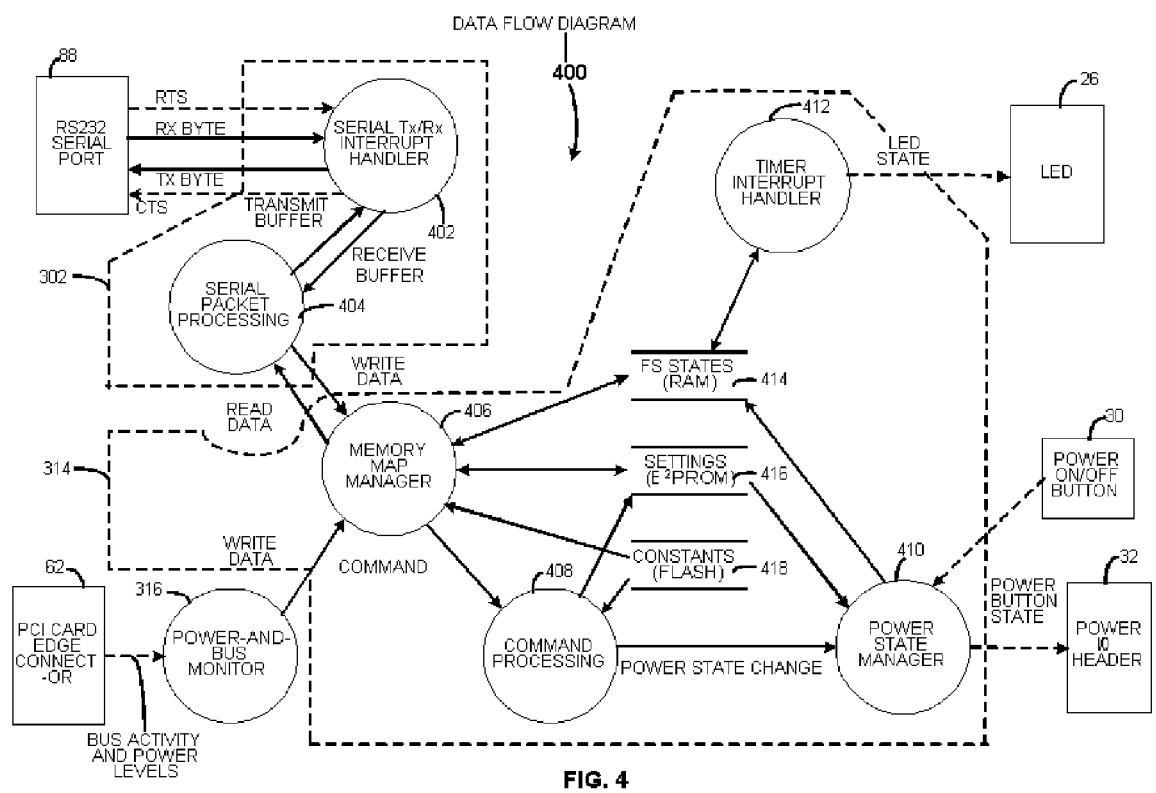
FIG. 4 illustrates a schematic diagram of one example of a data flow diagram in accordance with the software modules of FIG. 3.

FIG. 4 illustrates a schematic diagram of one example of a date flow diagram 400 in accordance with the software modules 300 of FIG. 3. The communications driver 302 of FIG. 3 is shown in FIG. 4 as comprised of a serial Tx/Rx interrupt handler 402 and a serial packet processing 404. The serial Tx/Rx interrupt handler 402 communicates over the communications link 60 via the RS232 serial port 88. Although an RS232 interface is mentioned, other interfaces, e.g. USB, RS422, etc., may be used to implement the communications link 60, as is known in the art. The serial packet processing 404 receives bytes of information from the serial Tx/Rx interrupt handler 402 and provides bytes of information for transmission by the serial Tx/Rx interrupt handler 402.

The example of FIG. 4 shows the malfunction detection and cold reboot logic 314 as comprised of a memory map manager 406, a command processing 408, a power state manager 410, and a timer interrupt handler 412. The memory map manager 406 may receive write data from the serial packet processing 404 and from the power-and-bus monitor 316. The memory map manager 406 may send read data to the serial packet processing 404 for output over the communications link 60. The memory map manager 406 processes the write data. For example, the memory map manager 406 may update the states of finite state machines (FSMs) in a finite state (FS) STATES 414 of RAM memory. FSMs may be implemented for watchdog timer state transitions, power state transitions, and for boot, programming, and normal operation mode state transitions. The use of FSMs in software technology is well known in the art and will not be discussed further herein. The memory map manager 406 may receive write data in the form of the monitoring and control logic 28 from the monitored device 12 for storage in memory 22, e.g. EEPROM memory. The memory map manager 406 may also update SETTINGS 416 in EEPROM memory. The SETTINGS 416 may include, for example, logged data related to malfunctions for subsequent analysis or, for example, value settings to indicate whether the timeout timer 18 and the communications link 60 are active and to be used. As discussed in FIG. 1, the monitoring device 10 may receive a reboot message over the communications link 60. The memory map manager 406 when receiving a reboot message from the serial packet processing 404 via the communications link 60 may notify the command processing 408. The command processing 408 may then inform the power state manager 410 to signal the power I/O header 32 of the monitored device 12 to reapply power to the monitored device 12. The memory map manager 406 or the command processing 408 may read CONSTANTS 418 from FLASH memory to determine constants and default settings. For example, the predetermined value 20 for the timeout timer 18, or the length of time to wait between signaling to power down and signaling to power up for a reapplication of power, may be stored in the CONSTANTS 418.

The command processing 408 receives command information from the memory map manager 406, for example, a command to reboot the monitored device 12, or commands for storing data, for example, commands to store the monitoring and control logic 28 into the memory 22 of FIG. 1. In this example, the memory 22 of FIG. 1 includes the FS STATES 414, SETTINGS 416, and CONSTANTS 418 as shown in FIG. 4.

The power state manager 410, based on receiving commands from the command processing 408 and based on updates to the memory 22 of FIG. 1, signals the power I/O header 32 of the monitored device 12 to reapply power when required. The timer interrupt handler 412 of FIG. 4 updates the FS STATES 414 when detecting a timer timeout, and may light an LED 26 to indicate timeout of the timeout timer 18.

Figure 5:
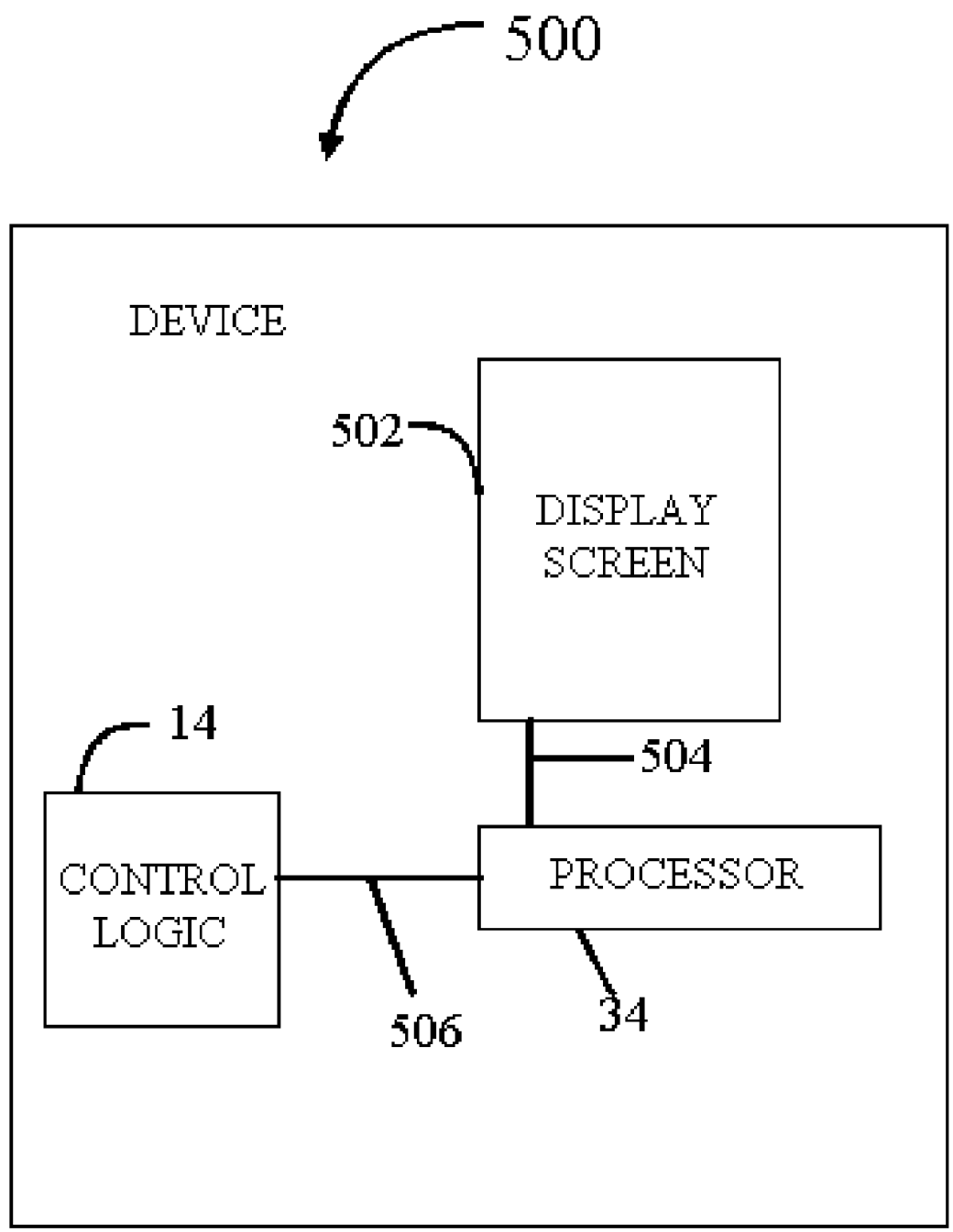
FIG. 5 illustrates a schematic block diagram of an example of a device with control logic configured to operate in accordance with the embodiment of FIG. 1.

FIG. 5 illustrates a schematic block diagram of an example of a device 500 with the control logic 14 of FIG. 1 configured to operate in accordance with the embodiment of FIG. 1. The device 500 has a display screen 502 connected via an electrical cable 504 to the processor 34 (FIG. 1). For example, the device 500 may be a personal computer (PC), a mobile phone, and the like. The control logic 14 is shown connected to the processor 34 via an electrical coupling 506. The electrical coupling 506 may employ an edge connector and may include connections as described in FIG. 1, for example, the auxiliary power line 68, the non-auxiliary power lines 66, access to the bus 64, and the communications link 60, as well as the power I/O header signal 50. The control logic 14 is operative to determine a malfunction state of the device 500, and to control a reapplication of power to the device 500 to reboot the device 500 based on the determined malfunction state of the device 500. The device 500 of FIG. 5 is an example of the integration of the monitored device 12 with the monitoring device 10 of FIG. 1. The device 500 may further comprise the message handler 306 of FIG. 3 operative to establish the communications link 60 (FIG. 1) with the control logic 14. The malfunction state of the device 500 may be determined when an expected message is not received by the control logic 14 or a reboot message is received by the control logic 14 over the communications link 60.

Figure 6:
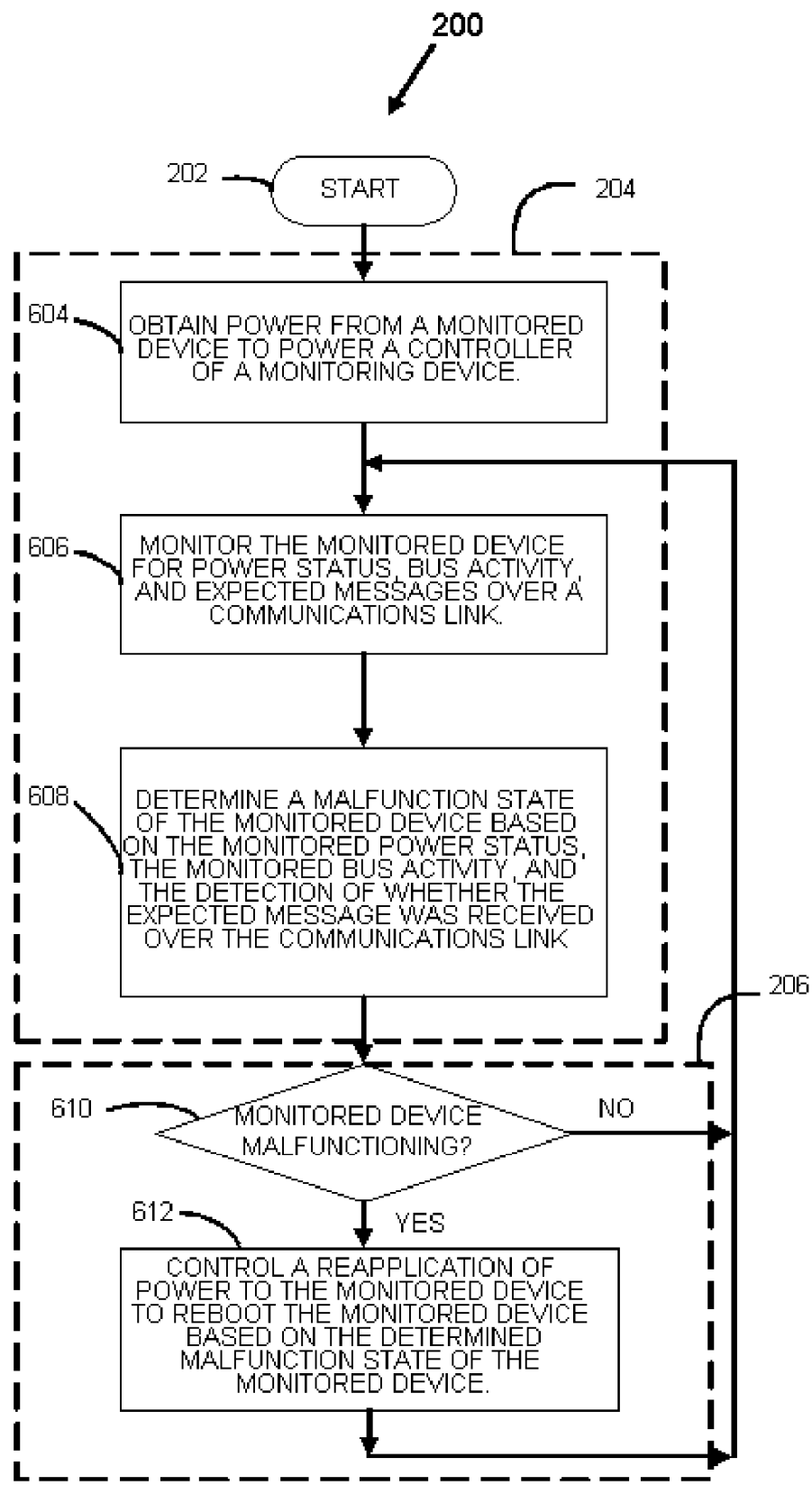
FIG. 6 shows a more detailed flowchart of the example method of FIG. 2.

FIG. 6 shows a more detailed flow chart of the example method 200 of FIG. 2. FIG. 6 begins with the start block 202 as described in FIG. 2. As shown in FIG. 6, the block 204 is comprised of the blocks 604, 606, and 608. The block 604 includes obtaining power from a monitored device, e.g. the monitored device 12 of FIG. 1, to power a controller of a monitoring device, e.g. the control logic 14 of FIG. 1. The block 606 includes monitoring the monitored device 12 for power status, bus activity, and the expected messages over the communications link 60 as exemplified in FIG. 1. The block 608 includes determining a malfunction state of the monitored device 12 based on the monitored power status, the monitored bus activity, and the detection of whether the expected message was received over the communications link 60. For example, a malfunction state of powered-off may be determined when no power is detected on the non-auxiliary power lines 66 of FIG. 1. A malfunction state of standby-power may be determined when power is present on the non-auxiliary power lines 66 and no bus activity is found on the bus 64. When power is detected on the non-auxiliary power lines 66 and bus activity is present on the bus 64, a malfunction state of powered-and-malfunctioning may be determined based on receiving or not receiving the expected messages over the communications link 60. As discussed previously, receiving or not receiving the expected messages over the communications link 60 may indicate a software malfunction or "crash".

As shown in FIG. 6, block 206 includes a decision block 610 and block 612. If the decision block 610 decides the monitored device 12 is not malfunctioning, processing returns to the block 606 from the decision block 610. Alternatively, if the decision block 610 decides the monitored device 12 is malfunctioning, processing proceeds to block 612 wherein a reapplication of power is signaled to the monitored device 12 to cause a cold reboot of the monitored device 12 based on the determined malfunctioned state of the monitored device 12. When processing in the block 612 completes, processing proceeds back to the block 606. Thus, the processing of the method 200 is an iterative loop that continues while the monitoring device 10 is in operation.

Figure 7:
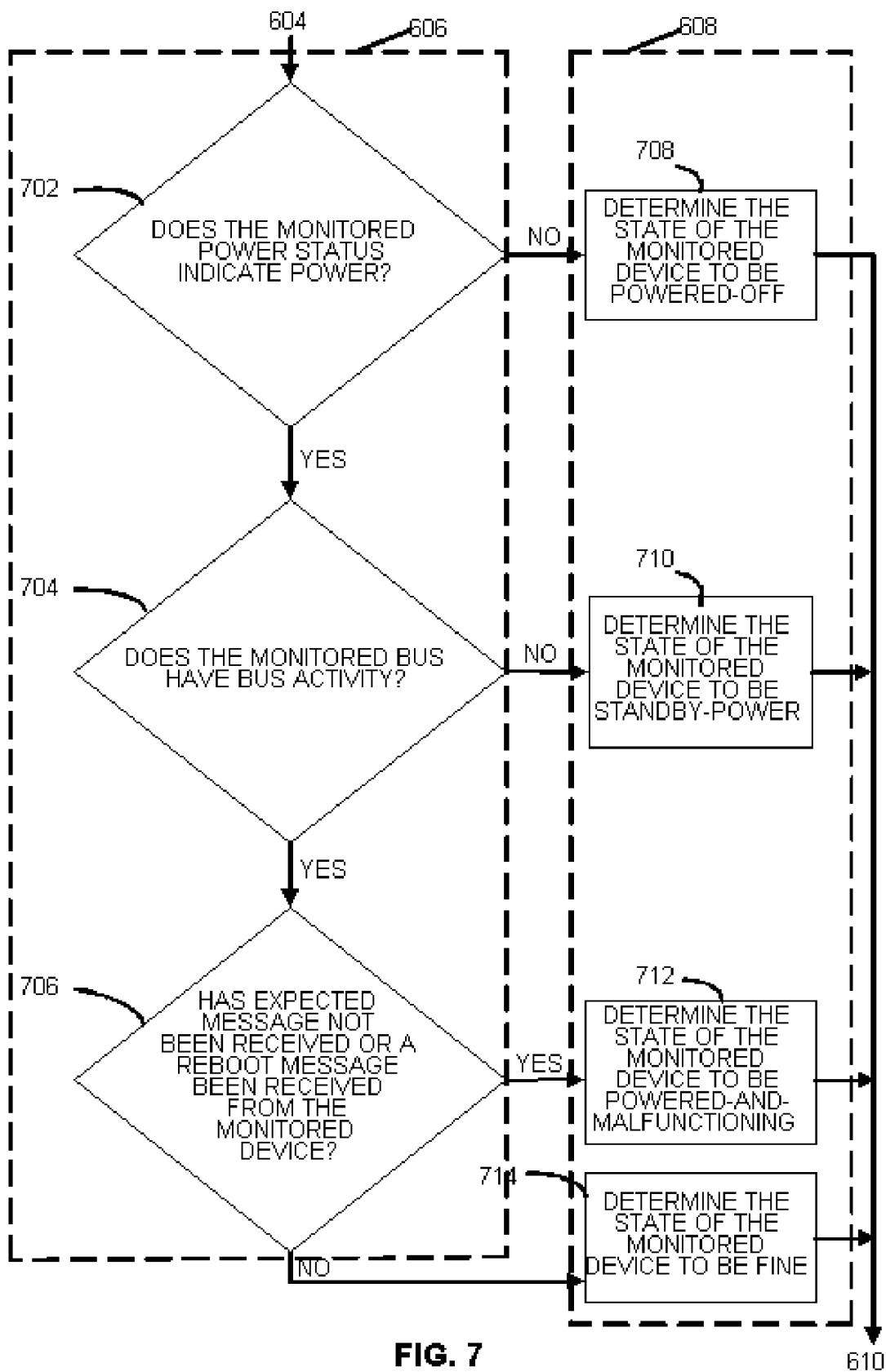
FIG. 7 shows further details of monitoring and determining blocks of the flowchart of FIG. 6.

FIG. 7 shows further details of the monitoring block 606 and the determining block 608 of the flow chart of FIG. 6. In FIG. 7, the block 606 is comprised of the decision blocks 702, 704, and 706. In the decision block 702, monitored power status is tested for whether power is indicated. For example, the FS states 414 of FIG. 4 may be updated to indicate monitored power status. If the decision block 702 determines that the monitored device 12 has no power, processing proceeds to block 708 wherein the malfunction state of the monitored device 12 is determined to be powered-off. If power is present, processing proceeds to the decision block 704 to test whether the monitored bus 64 has bus activity. If bus activity is not present, processing proceeds to block 710 wherein the malfunction state of the monitored device 12 is determined to be standby-power. If bus activity is present, processing proceeds from the decision block 704 to the decision block 706. The decision block 706 tests for whether expected messages 26 have not been received over the communications link 60, or whether a reboot message has been received over the communications link 60, and if so, processing proceeds to block 712 wherein the malfunction state of the monitored device 12 is determined to be powered-and-malfunctioning. In the case where the decision block 706 does not determine a malfunctioning, processing proceeds to block 714 wherein the malfunction state of the monitored device 12 is determined to be powered-and-functioning. The processing blocks 708, 710, 712, and 714 comprise the block 608, and processing proceeds from the block 608 to the block 610.

Figure 8:
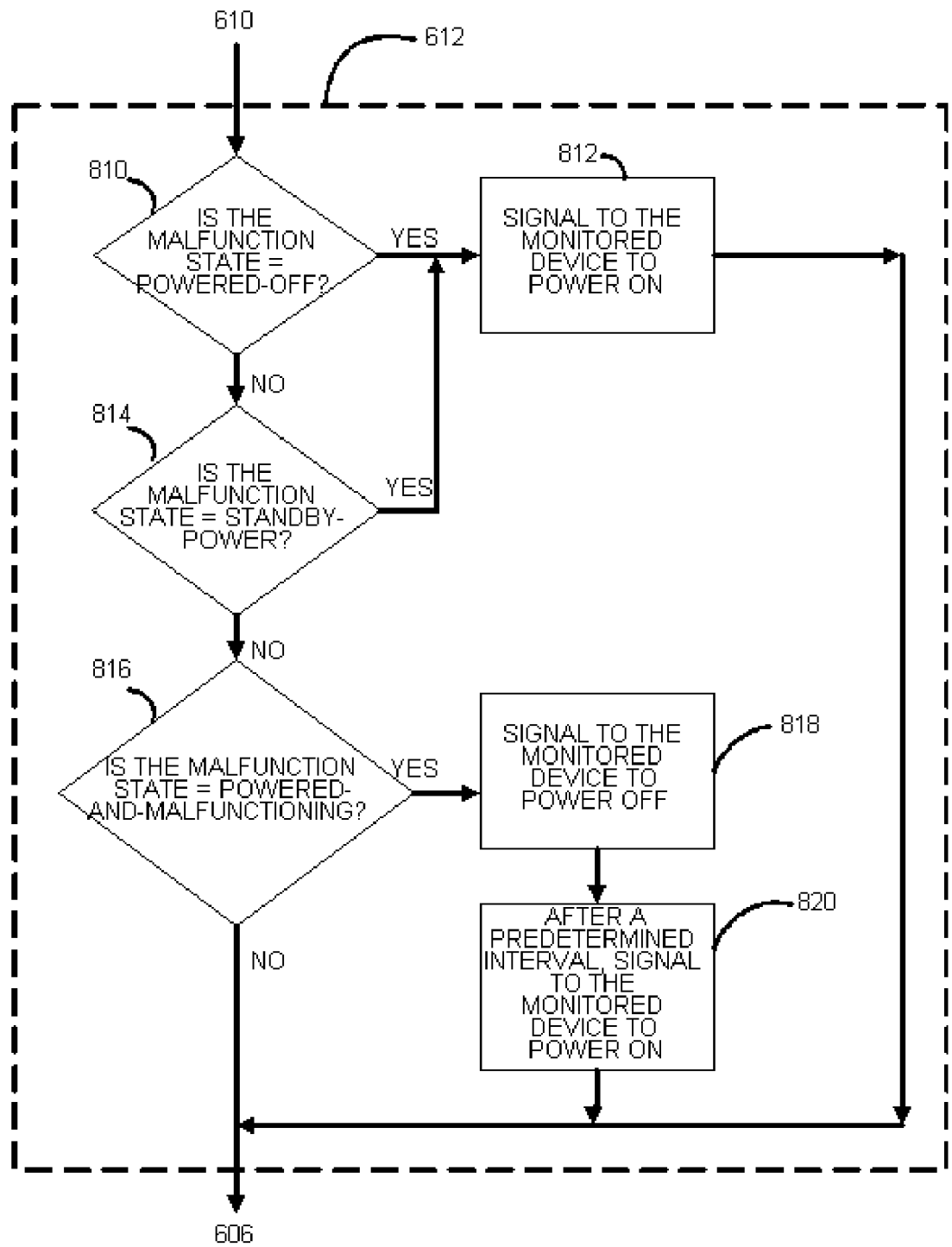
FIG. 8 shows further details of a block of the flowchart of FIG. 6.

FIG. 8 shows further details of the block 612 of FIG. 6. The decision blocks 810, 814, and 816 test the malfunction state for the type of malfunction. If the malfunction state is found to be powered-off at the decision block 810, processing proceeds to block 812 wherein a signal is sent to the monitored device 12 to cause powering up or powering on. Processing then proceeds back to the block 606. Alternatively, if the malfunction state is not powered-off, processing proceeds from the decision block 810 to the decision block 814. The decision block 814 tests for the malfunction state being standby-power. If so, processing proceeds to block 812. Alternatively, if the malfunction state is not standby-power, processing proceeds from the decision block 814 to the decision block 816 wherein the malfunction state is tested for being powered-and-malfunctioning. If the malfunction state is found to be powered-and-malfunctioning, processing proceeds from the decision block 816 to the block 818. The block 818 includes signaling the monitored device 12 to power off. Processing then proceeds to block 820. The block 820 includes, after a predetermined interval of time, signaling the monitored device 12 to cause powering on. Processing then proceeds back to the block 606. If at the decision block 816 the malfunction state is not found to be powered-and-malfunctioning, processing proceeds from the decision block 816 back to the block 606.

As illustrated in the above examples, the monitoring device 10 may if desired cause the monitored device 12 to perform a cold reboot by appropriately signaling the monitored device 12. A cold reboot reapplies power to the monitored device 12, thus returning hardware as well as software to normal operations. Also, if desired, the monitoring device 10 may obtain auxiliary power from the monitored device 12 such that when the monitored device 12 is powered off, the monitoring device 10 is still enabled to perform reapplication of power signaling to the monitored device 12. If desired, the monitoring device 10 may monitor the power state and bus activity of a bus of the monitored device 12. By monitoring both, the monitoring device 10 may determine the power state of the monitored device 12 to be in a low power mode, e.g. a standby-power mode, as well as completely powered off. Also, if desired, the monitoring device 10 can simulate a keyboard device to the monitored device 12 to facilitate testing the monitored device 12. The monitoring device 10 may, also if desired, choose when to simulate a key press and send an associated key press message to the monitored device 12, and in return expect a response message. When not receiving the expected response message, the monitoring device 10 may determine the monitored device 12 to have malfunctioning software.

The above detailed description and the examples described therein have been presented for the purposes of illustration and description only and not by limitation. For example, the operations described may be done in any suitable manner. The method steps may be done in any suitable order still providing the described operations and results. It is therefore contemplated that the present invention cover any and all modifications, variations or equivalents that fall within the spirit and scope of the basic underlying principles disclosed above and claimed herein.

What is claimed is:

1. A monitoring device configured to be coupled to a separate monitored device, the monitoring device comprising:
   control logic operative to:
   determine a malfunction state of the monitored device;
   control a reapplication of power to the monitored device to reboot the monitored device based on the determined malfunction state of the monitored device; and
   wherein the monitoring device is configured to receive power from the monitored device via at least one of: an auxiliary power source of the monitored device supplying power when the monitored device is powered off and a wake-on-LAN (WOL) signal of the monitored device.

2. The monitoring device of claim 1, wherein the determined malfunction state of the monitored device is based upon at least one of: a monitored power status, a monitored bus activity, and a detection of whether an expected message was received over a communications link.

3. The monitoring device of claim 1, wherein the monitoring device is a card configured to connect to the monitored device.

4. The monitoring device of claim 1, wherein the control logic is further operative to:
   signal the monitored device to cause a power down of the monitored device when the determined malfunction state of the monitored device indicates the monitored device having power, includes standby power, and after a predetermined interval of time, signal the monitored device to cause a power up of the monitored device; and
   signal the monitored device to cause the monitored device to power up when the determined malfunction state of the monitored device indicates the monitored device being powered off.

5. A monitoring device comprising: a display screen; and control logic operative to: determine a malfunction state of a monitored device; and control a reapplication of power to the monitored device to reboot the monitored device based on the determined malfunction state of the monitored device by switching, within the monitoring device, DC power to the monitored device.

6. The device of claim 5, wherein the control logic is operative to receive power from the monitored device and further comprising a message handler operative to establish a communications link with the control logic, the malfunction state of the monitored device determined when at least one of an expected message is not received by the control logic and a reboot message is received by the control logic.

7. A monitoring device configured to be coupled to a separate monitored device, the monitoring device comprising:
   a controller operative to obtain power from the monitored device; and
   memory, operatively coupled to the controller, the memory including instructions that when executed by one or more controllers, causes the one or more controllers to:
   monitor power status of the monitored device via non-auxiliary power signals between the monitored device and the monitoring device;
   monitor a bus of the monitored device for bus activity;
   detect whether an expected message is received over a communications link;
   determine a malfunction state of the monitored device based on the monitored power status, the monitored bus activity, and the detection of whether the expected message was received over the communications link; and
   control a reapplication of power to the monitored device to reboot the monitored device based on the determined malfunction state of the monitored device.

8. The monitoring device of claim 7 further configured to power the controller with at least one of auxiliary power from the monitored device, the auxiliary power powering the controller when the monitored device is powered off, and power from a wake-on-LAN (WOL) signal of the monitored device.

9. The monitoring device of claim 7, wherein the instructions when executed cause the one or more controllers to simulate a keyboard device to the monitored device via the communications link, the expected message over the communications link being in response to a message sent from the simulated keyboard device.

10. A method for monitoring and controlling a monitored device, comprising:
    determining a malfunction state of the monitored device;
    controlling a reapplication of power to the monitored device to reboot the monitored device based on the determined malfunction state of the monitored device; and
    receiving power from the monitored device via at least one of: an auxiliary power source supplying power when the monitored device is powered off and a wake-on-LAN (WOL) signal of the monitored device.

11. The method according to claim 10, wherein the determining a malfunction state of the monitored device is based upon at least one of: a monitored power status, a monitored bus activity, and a detection of whether an expected message was received over a communications link.

12. The method according to claim 10, wherein the controlling a reapplication of power to the monitored device includes:
    when the determined malfunction state of the monitored device indicates the monitored device having power, including standby power, signaling the monitored device to cause a power down of the monitored device, and after a predetermined interval of time, signaling the monitored device to cause a power up of the monitored device; and
    when the determined malfunction state of the monitored device indicates the monitored device being powered off, signaling the monitored device to cause the monitored device to power up.

13. A method for monitoring and controlling a monitored device by a separate monitoring device, comprising:
    obtaining power from the monitored device to power a controller of the monitoring device;
    monitoring power status of the monitored device via non-auxiliary power signals between the monitored device and the monitoring device;
    monitoring for bus activity of a bus of the monitored device;

detecting whether an expected message is received over a communications link;

determining a malfunction state of the monitored device based on the monitored power status, the monitored bus activity, and the detection of whether the expected message was received over the communications link; and controlling a reapplication of power to the monitored device to reboot the monitored device based on the determined malfunction state of the monitored device.

14. The method according to claim 13, wherein the obtaining power from the monitored device includes at least one of obtaining auxiliary power from the monitored device, the auxiliary power powering the controller when the monitored device is powered off, and obtaining power from a wake-on-LAN (WOL) signal of the monitored device.

15. The method according to claim 13, wherein the monitoring power status of the monitored device includes monitoring a voltage level of at least one non-auxiliary power source of the monitored device, and the determining a malfunction state of the monitored device determines the malfunction state to be powered-off when the voltage level of at least one non-auxiliary power source is basically zero.

16. The method according to claim 13, wherein the monitoring for bus activity of a bus includes monitoring logic levels of at least one of an address bus and a data bus of the bus of the monitored device, and the determining a malfunction state of the monitored device determines the malfunction state to be standby-power when the monitored power status indicates power and the monitored bus activity indicates no bus activity.

17. The method according to claim 13, wherein the detecting whether an expected message is received over a communications link includes detecting a lack of receiving an expected message, the lack of receiving the expected message causing the determined malfunction state to be powered-and-malfunctioning when the monitored power status indicates power and the monitored bus activity indicates bus activity.

18. The method according to claim 17, wherein the expected message is a response message sent by the monitored device in response to receiving a key press message from a simulated keyboard device, the monitoring device simulating the keyboard device to the monitored device.

19. The method according to claim 18, wherein the received key press message is a make-and-break key code message for a Num Lock key press, a Scroll Lock key press, or a Caps Lock key press, and the expected response message is a set-LED message requesting an LED corresponding to the key press be appropriately set.

20. The method according to claim 13, wherein the detecting whether an expected message is received over a communications link includes detecting a reboot message, the reboot message when received causing the determined malfunction state to be powered-and-malfunctioning when the monitored power status indicates power and the monitored bus activity indicates bus activity.

21. The method according to claim 13, wherein the controlling a reapplication of power to the monitored device includes:

when the determined malfunction state of the monitored device indicates the monitored device having power, including standby power, signaling the monitored device to cause a power down of the monitored device, and after a predetermined interval of time, signaling the monitored device to cause a power up of the monitored device; and when the determined malfunction state of the monitored device indicates the monitored device being powered off, signaling the monitored device to cause the monitored device to power up.

* * * * *